US011332569B2

(12) United States Patent
Scussolin et al.

(10) Patent No.: US 11,332,569 B2
(45) Date of Patent: May 17, 2022

(54) LOW DENSITY POLYURETHANE ELASTOMER FOAM WITH HIGH BALL REBOUND

(71) Applicants: Dow Global Technologies LLC, Midland, MI (US); Dow Italia Divisione Commerciale S.R.L., Milan (IT)

(72) Inventors: Silvia Scussolin, Correggio (IT); Luciano Zanacchi, Correggio (IT); Alessio Sabadini, Correggio (IT)

(73) Assignees: Dow Global Technologies LLC, Midland, MI (US); Dow Italia Divisione Commerciale S.R.L., Milan (IT)

( * ) Notice: Subject to any disclaimer, the term of this patent is extended or adjusted under 35 U.S.C. 154(b) by 340 days.

(21) Appl. No.: 16/489,478

(22) PCT Filed: Mar. 2, 2018

(86) PCT No.: PCT/US2018/020626
§ 371 (c)(1),
(2) Date: Aug. 28, 2019

(87) PCT Pub. No.: WO2018/160945
PCT Pub. Date: Sep. 7, 2018

(65) Prior Publication Data
US 2020/0071448 A1 Mar. 5, 2020

(30) Foreign Application Priority Data

Mar. 3, 2017 (IT) .................. 102017000023941

(51) Int. Cl.
*C08G 18/12* (2006.01)
*C08G 18/08* (2006.01)
*C08G 18/32* (2006.01)
*C08G 18/48* (2006.01)
*C08G 18/76* (2006.01)
*C08G 18/79* (2006.01)

(52) U.S. Cl.
CPC ............ *C08G 18/12* (2013.01); *C08G 18/14* (2013.01); *C08G 18/3206* (2013.01); *C08G 18/485* (2013.01); *C08G 18/7671* (2013.01); *C08G 18/797* (2013.01); *C08G 2110/0058* (2021.01); *C08G 2110/0066* (2021.01); *C08G 2110/0083* (2021.01); *C08G 2410/00* (2013.01)

(58) Field of Classification Search
CPC .... C08G 18/12; C08G 18/14; C08G 18/3206; C08G 18/4808; C08G 18/4845; C08G 18/485; C08G 18/4854; C08G 18/6674; C08G 18/6677; C08G 18/7671; C08G 18/797; C08G 2110/0058; C08G 2110/0066; C08G 2110/0083; C08G 2120/00; C08G 2410/00
See application file for complete search history.

(56) References Cited

U.S. PATENT DOCUMENTS

| 6,221,999 | B1 | 4/2001 | Peter |
| 6,329,441 | B1 | 12/2001 | Okubo et al. |
| 6,341,432 | B1 | 1/2002 | Muller |
| 6,782,639 | B1 | 8/2004 | Muller |
| 7,169,030 | B1 | 1/2007 | Kulp |
| 8,653,157 | B2 | 2/2014 | Holeschovsky et al. |
| 9,023,910 | B2 | 5/2015 | Bollmann et al. |
| 10,710,410 | B2 | 7/2020 | Van Dyck et al. |
| 2001/0031797 | A1* | 10/2001 | Kuwamura ............ C08G 18/10 521/155 |
| 2013/0197118 | A1 | 8/2013 | Bollmann et al. |

(Continued)

FOREIGN PATENT DOCUMENTS

| CN | 101633717 | 1/2010 |
| CN | 102585162 | 7/2012 |
| CN | 102719085 | 10/2012 |
| CN | 102786661 | 11/2012 |
| CN | 103497302 | 1/2014 |
| CN | 104066763 | 9/2014 |
| CN | 105037676 | 11/2015 |
| CN | 106854273 | 6/2017 |

(Continued)

OTHER PUBLICATIONS

International Preliminary Report on Patentability for related PCT Application PCT/US2018/020626, dated Sep. 12, 2019 (8 pgs).

(Continued)

*Primary Examiner* — John M Cooney
(74) *Attorney, Agent, or Firm* — Brooks, Cameron & Huebsch, PLLC

(57) ABSTRACT

The present disclosure provides for a polyurethane elastomer foam formed by reacting a mixture that includes 60 to 50 weight percent (wt. %) of a polyol formulation and 40 to 50 wt. % isocyanate pre-polymer (wt. % based on the total weight of the mixture). The polyol formulation includes 85 to 92 wt. % of a polytetramethylene ether glycol (PTMEG) with a weight average molecular weight of 1900 to 2100 and a hydroxyl number of about 53 to about 60; 4 to 10 wt. % of monoethylene glycol; a blowing agent; a catalyst; and a surfactant (wt. % values for the polyol formulation based on the total weight of the polyol formulation). The isocyanate pre-polymer includes 55 to 70 wt. % of a isocyanate blend having at least 90 wt. % of 4,4'-diphenylmethane diisocyanate; and 30 to 45 wt. % of the PTMEG, where the isocyanate pre-polymer has an isocyanate content of 16 to 21 wt. % based on the total weight of the isocyanate pre-polymer, and the polyurethane elastomer foam has a ball rebound of at least 50% measured according to ASTM D3574 on a 10 mm thickness test plate.

18 Claims, No Drawings

(56) References Cited

U.S. PATENT DOCUMENTS

2017/0073456 A1* 3/2017 Shimizu ............ H01L 21/30625
2017/0174818 A1   6/2017 Vonorcik et al.
2017/0198086 A1* 7/2017 Albuerne ............. C08G 18/246

FOREIGN PATENT DOCUMENTS

| EP | 2275465 | 1/2011 |
|----|---------|--------|
| JP | H08198927 | 8/1996 |
| JP | 2000191741 A | 7/2000 |
| JP | 2006282840 | 10/2006 |
| JP | 2016064455 | 4/2016 |
| KR | 888434 | 3/2009 |
| TW | 200514800 | 5/2005 |
| WO | 9117197 | 11/1991 |
| WO | 2013045405 | 4/2013 |
| WO | 2013179799 | 12/2013 |
| WO | 2015062960 | 5/2015 |

OTHER PUBLICATIONS

International Search Report & Written Opinion for related PCT Application PCT/US2018/020626, dated May 4, 2018 (11 pgs).

* cited by examiner

LOW DENSITY POLYURETHANE ELASTOMER FOAM WITH HIGH BALL REBOUND

This application is a National Stage Application under 35 U.S.C. § 371 of International Application Number PCT/US2018/020626, filed Mar. 2, 2018 and published as WO 2018/160945 on Sep. 7, 2018, which claims the benefit to Italian Non-Provisional Application 102017000023941, filed Mar. 3, 2017, the entire contents of which are incorporated herein by reference in its entirety.

TECHNICAL FIELD

The present disclosure relates generally to polyurethanes and more particularly to low density polyurethane elastomer foams for use in shoe soles.

BACKGROUND

Polyurethane elastomer foams provide light weight, highly abrasion-resistant materials for shoe soles. Applications for such polyurethane elastomer foams include a wide range of footwear types such as sports and trekking shoes and boots along with shoes for business and fashion shoe soles, as well as high-quality safety shoes.

To achieve light weight soles the polyurethane elastomer foam needs to have a low-density (e.g., no greater than 500 grams/liter). In addition to light weight, the polyurethane elastomer foam also needs to have sufficient hardness (e.g., Shore A hardness above 40) and high rebound properties. Having high rebound properties in a sole is advantageous as it can help to improve overall shoe comfort and performance.

Creating such polyurethane elastomer foams with high rebound properties has been approached in a number of ways. For example, U.S. Pat. Nos. 9,023,910 and 6,329,441 use polytetramethylene ether glycol (PTMEG) along with two or more secondary glycols to produce polyurethane elastomer foam with high rebound properties in a multistep process. Including the additional glycols, however, leads to increase costs and multiple processing steps that if at all possible should be avoided. So, the problem to solve is to provide a process with fewer steps (e.g., a "one shot" process) to produce low density, semi-hard (Shore A hardness above 40) polyurethane elastomer foam with high ball bounce value (higher than 50%) that also display superior flex fatigue resistance at room temperature and even in cold conditions (i.e, at temperatures as cold as −15° C.).

SUMMARY

Embodiments of the present disclosure provide polyurethane elastomer foam produced in a "one shot process" that has low density (no greater than 500 grams/liter) are semi-hard (Shore A hardness above 40), display a surprisingly high ball bounce value (higher than 50%) all while providing superior flex fatigue resistance at room temperature (23° C.) and even in cold conditions (i.e, at temperatures as cold as −15° C.). It has been surprisingly found that the use of polytetramethylene ether glycol (PTMEG) in combination with monoethylene glycol (MEG) as the only polyols provides a polyurethane elastomer foam that display the above properties. The polyurethane elastomer foam of the present disclosure differs significantly from the prior art polyurethane elastomer foam in that, as noted, the only polyols used in forming the polyurethane elastomer foam is PTMEG and MEG.

The polyurethane elastomer foam of the present disclosure has a density of 100 to 500 g/L measured according to DIN 53420 and a Shore A hardness of 40 to 55 measured according to DIN 53505. The polyurethane elastomer foam is formed by reacting a mixture that includes 60 to 50 weight percent (wt. %) of a polyol formulation and 40 to 50 wt. % isocyanate pre-polymer, where the wt. % is based on the total weight of the mixture. The polyol formulation includes a glycol mixture consisting of 85 to 92 wt. % of a polytetramethylene ether glycol (PTMEG) with a weight average molecular weight (MWw) of 1900 to 2100 and a hydroxyl number of about 53 to about 60 and 4 to 10 wt. % of monoethylene glycol; at least one blowing agent; at least one catalyst; and at least one surfactant, where the wt. % values for the polyol formulation are based on the total weight of the polyol formulation and where the at least one blowing agent, the at least one catalyst and the at least one surfactant together bring the wt. % of the polyol formulation to 100 wt. %. The isocyanate pre-polymer includes 55 to 70 wt. % of a isocyanate blend having at least 90 wt. % of 4,4'-diphenylmethane diisocyanate; and 30 to 45 wt. % of the PTMEG, where the isocyanate pre-polymer has an isocyanate content of 16 to 21 wt. % based on the total weight of the isocyanate pre-polymer. Preferably, the isocyanate pre-polymer has an isocyanate content of 18 to 20 wt. % based on the total weight of the isocyanate pre-polymer. The polyurethane elastomer foam has a ball rebound of at least 50% measured according to ASTM D3574 on a 10 mm thickness test plate. The mixture described herein does not include other polyols in either the polyol formulation or the isocyanate pre-polymer. In other words, there are only two polyols (PTMEG and MEG) in the mixture that forms the polyurethane elastomer foam of the present disclosure.

For the embodiments, the polyol formulation includes 6 to 8 wt. % of monoethylene glycol. For the embodiments, the polyol formulation includes 88 to 91 wt. % of the PTMEG. In one embodiment, the polyol formulation includes 7 wt. % of the monoethylene glycol and 0.7 wt. % of the at least one blowing agent. In one embodiment, the blowing agent is water.

For the embodiments, the isocyanate blend includes 94 to 99 wt. % of 4,4'-diphenylmethane diisocyanate and 6 to 1 wt. % of 2,4'-diphenylmethane diisocyanate. In additional embodiments, the isocyanate blend includes 97 to 98 wt. % of 4,4'-diphenylmethane diisocyanate and 3 to 2 wt. % of 2,4'-diphenylmethane diisocyanate. The isocyanate pre-polymer of the mixture can further include 1 to 3 wt. % of an ethylene oxide/propylene oxide diol having a hydroxyl number of 26 to 29, and 3 to 5 wt. % of an uretonimine modified methylene diphenyl diisocyanate. In one embodiment, the isocyanate pre-polymer of the mixture includes 2 wt. % of the ethylene oxide/propylene oxide diol, and 4 wt. % of the uretonimine modified methylene diphenyl diisocyanate.

As mentioned, the polyurethane elastomer foam can has a ball rebound of at least 50% measured according to ASTM D3574 on a 10 mm thickness test plate. In addition, the polyurethane elastomer foam of the present disclosure can has a ball rebound of 55% to 65% measured according to ASTM D3574 on a 10 mm thickness test plate.

The present disclosure also provides for a method of forming the polyurethane elastomer foam. The method includes providing a polyol formulation that includes a glycol mixture consisting of 85 to 92 wt. % of a polytetramethylene ether glycol (PTMEG) with a weight average molecular weight (MWw) of 1900 to 2100 and a hydroxyl number of about 53 to about 60 and 4 to 10 wt. % of monoethylene glycol; the at least one blowing agent, the at least one catalyst; and the at least one surfactant, where the wt. % values for the polyol formulation are based on the total weight of the polyol formulation and where the at least one blowing agent, the at least one catalyst and the at least one surfactant together bring the wt. % of the polyol formulation to 100 wt. %. The method further includes providing a mixture at a temperature of 65° C., where the mixture has 55 to 70 wt. % of the isocyanate blend having at least 90 wt. % of 4,4'-diphenylmethane diisocyanate; 30 to 45 wt. % of the PTMEG; and 1 to 3 wt. % of an ethylene oxide/propylene oxide diol having a hydroxyl number of 26 to 29. Heat the mixture to a temperature of 85° C. and mix the mixture at 85° C. for two (2) hours. After mixing at 85° C. for two hours, cool the mixture to 70° C. The method further includes admixing 3 to 5 wt. % of an uretonimine modified methylene diphenyl diisocyanate with the mixture to form an isocyanate pre-polymer having an isocyanate content of 16 to 21 wt. % based on the total weight of the isocyanate pre-polymer. Mix 60 to 50 wt. % of the polyol formulation and 40 to 50 wt. % of the isocyanate pre-polymer to form a reaction mixture, where the wt. % is based on the total weight of the mixture. Allow the reaction mixture to react to form the polyurethane elastomer foam.

The polyurethane elastomer foam of the present disclosure can be used in a "one shot process" to produce a shoe sole, a mid-sole or an insole for a shoe. The shoe sole may be used for forming an outer sole of a sandal type shoe, a midsole of an athletic type shoe, or an insole for insertion into any type of shoe.

DETAILED DESCRIPTION

Embodiments of the present disclosure provide polyurethane elastomer foam produced in a "one shot process" that has low density (no greater than 500 grams/liter) are semi-hard (Shore A hardness above 40), display a surprisingly high ball bounce value (higher than 50%) all while providing superior flex fatigue resistance at room temperature (23° C.) and even in cold conditions (i.e, at temperatures as cold as −15° C.). The polyurethane elastomer foam of the present disclosure also has a low compression set. It has been surprisingly found that the use of polytetramethylene ether glycol (PTMEG) in combination with monoethylene glycol (MEG) as the only polyols provides the polyurethane elastomer foam that displays the above properties. The polyurethane elastomer foam of the present disclosure differs significantly from the prior art polyurethane elastomer foam in that, as noted, the only polyols used in forming the polyurethane elastomer foam is PTMEG and MEG.

The polyurethane elastomer foam of the present disclosure is ideal for the production of comfortable, single density shoe soles, mid-soles and/or insoles for casual applications, such as athletic or technical shoes. In addition, the polyurethane elastomer foam of the present disclosure is superior to ethylene vinyl acetate (EVA) in terms of ball rebound and compression set. In addition, the only polyols used in forming the polyurethane elastomer foam is PTMEG and MEG. The mixture used to form the polyurethane elastomer foam do not include other polyols, such as butane-1,4-diol, among others. The combination of only PTMEG with MEG (without other diols) in a "one shot" process of the present disclosure surprising gives a semi hard elastomer with low density, high resiliency and superior flex fatigue resistance with just the MEG chain extender. In addition, the polyurethane elastomer foam of the present disclosure has good processing, cures well, has good surface quality and shows minimal shrinkage at demold, although its density is low.

The polyurethane elastomer foam of the present disclosure has a density of 100 to 500 grams/liter (g/l) measured according to DIN 53420. Preferably, the polyurethane elastomer foam of the present disclosure has a density of 300 g/l to 400 g/l measured according to DIN 53420. This density of the polyurethane elastomer foam means the averaged density over the entire polyurethane elastomer foam. The polyurethane elastomer foam of the present disclosure also has a Shore A hardness above 40, as measured by DIN 53505. Preferably, the polyurethane elastomer foam of the present disclosure has a Shore A hardness of 40 to 55 measured according to DIN 53505. The polyurethane elastomer foam of the present disclosure also has a ball rebound of at least 50% measured according to ASTM D3574 on a 10 mm thickness test plate. The polyurethane elastomer foam of the present disclosure can have a ball rebound of 50% to 65% as measured according to ASTM D3574 on a 10 mm thickness test plate. Preferably, the polyurethane elastomer foam of the present disclosure has a ball rebound of 55% to 65% measured according to ASTM D3574 on a 10 mm thickness test plate. In addition, the polyurethane elastomer foam of the present disclosure preferably targets a compression set of no greater than 80% as measured according to ASTM D395. Other properties of the polyurethane elastomer foam include a tear strength ranging from 3.5 to 5.5 N/mm measured according to ISO 34-Type A (Trouser); a tensile strength of 3.5 to 7 N/mm$^2$ as measured according to DIN 53504; elongation at break of 350 to 450% as measured according to DIN 53504; an abrasion resistance of 50 to 80 mg lost as measured according to ISO 4649; and a flex fatigue of at least 30,000 cycles measured according to DIN 53543 at 23° C., with Texon and cut, using a DeMattia equipment. Under humid aging conditions (1 week at 70° C. and 100% RH), the polyurethane elastomer foam had a tear strength of 3.3 N/mm (3.1 N/mm without ageing) as measured according to ISO 34-Type A (Trouser), a tensile strength of 6.4 N/mm2 (6.6 N/mm2 without ageing) as measured according to DIN 53504 and an elongation at break of 370% (350% without ageing) as measured according to DIN 53504. The polyurethane elastomer foam of the present disclosure also has a Tg in a range of −35° C. to −50° C., where the method for measuring the Tg is described in the Examples section below.

The polyurethane elastomer foam described herein is formed by reacting a mixture that includes 60 to 50 weight percent (wt. %) of a polyol formulation and 40 to 50 wt. % isocyanate pre-polymer, where the wt. % is based on the total weight of the mixture. Preferably, the mixture includes 56 to 54 wt. % of the polyol formulation and 44 to 46 wt. % isocyanate pre-polymer, where the wt. % is based on the total weight of the mixture. The wt % of the polyol formulation and the isocyanate pre-polymer forming the mixture can add up to 100 wt % where the wt. % is based on the total weight of the mixture.

The polyol formulation includes a glycol mixture consisting of 85 to 92 wt. % of a polytetramethylene ether glycol (PTMEG) with a weight average molecular weight (MWw) of 1900 to 2100 and a hydroxyl number of about 53 to about 60 and 4 to 10 wt. % of monoethylene glycol (MEG), where the wt. % are based on the total weight of the polyol formulation. The glycol mixture consisting of 85 to 92 wt. % of the PTMEG described herein and 6 to 8 wt. % of MEG is preferred. The glycol mixture consisting of 88 to 91 wt. % of the PTMEG described herein and 6 to 8 wt. % of MEG is more preferred. In one embodiment, the glycol mixture preferably consists of 89 wt. % of the PTMEG described herein and 6 to 8 wt. % of MEG. In an additional preferred embodiment, the glycol mixture preferably consists of 91 wt. % of the PTMEG described herein and 6 wt. % of MEG.

Examples of the PTMEG include TERATHANE® PTMEG 2000 commercially available from INVISTA. TERATHANE® PTMEG 2000 has a weight average molecular weight of 1900 to 2100 and a hydroxyl number (mg KOH/gm) of 53.4 to 59.1. Other examples of PTMEG suitable for the present disclosure include PolyTHF 2000, commercially available from BASF, which has a weight average molecular weight of 1950 to 2050, and a hydroxyl number (mg KOH/gm) of 54.7 to 57.5. Other PTMEGs having a MWw of 1900 to 2100 and a hydroxyl number of about 53 to about 60 are commercially available and would be suitable for the present disclosure. Examples of MEG include those commercially available from MEGolbal® or GELSENCHEM Chemical Products GmbH.

The polyol formulation further includes at least one blowing agent, at least one catalyst, and at least surfactant. For the various embodiments, the at least one blowing agent, the at least one catalyst and the at least one surfactant together bring the wt. % of the polyol formulation to 100 wt. %. For the various embodiments, the preferable blowing agent is water. Preferably, the water is present in the polyol formulation from 0.6 to 0.8 wt. %, where the wt. % are based on the total weight of the polyol formulation. Most preferably, 0.7 wt. % of the water is present in the polyol formulation. So, for example, the polyol formulation can include the glycol mixture preferably consisting of 89 wt. % of the PTMEG described herein, 7 wt. % of MEG and 0.7 wt. % of water as the sole blowing agent. In an additional preferred embodiment, polyol formulation can include the glycol mixture preferably consisting of 91 wt. % of the PTMEG described herein, 6 wt. % of MEG and 0.7 wt. % of water as the sole blowing agent.

Physical blowing agents can also be used in combination with the water. Examples of such physical blowing agent include, but not limited to, Expancel unexpanded microspheres (i.e 031 DU 40 grade, AkzoNobel), Ecomate® (Foam Supplies Inc.), dichloro(difluoro)methane, bromo(trifluoro)methane and chloro(difluoro)methane. Water as the sole blowing agent is, however, preferred. An additional preferred blowing agent includes water with low global warming potential (GWP) blowing agents.

Catalysts suitable for the present disclosure include amine based catalysts, organic metal catalyst compounds and tetraalkylstannoxy based catalysts. Examples of amine based catalysts include a triethylendiamine (TEDA) based catalyst, a triethanolamine (TEA) based catalyst, a diisopropylethanolamine (DIEA) based catalyst, a pentamethyldiethylenetriamine based catalyst, a tertamethyl butanediamine based catalyst, a dimethylcyclohexylamine based catalyst, a bis(dimethylaminopropyl)methylamine based catalyst, a bis(2-dimethylaminoethyl) ether and a 1,8-diazobicyclo[5,4,0]unde-7-cene (DBU) based catalyst. Other examples of suitable catalysts include 2,3-dimethyl-3,4,5,6-tetrahydropyrimidine, tertiary amines such as triethylamine, tributylamine, dimethylbenzylamine, N-methyl, N-ethyl, N-cyclohexylmorpholine, N,N,N',N'-tetramethylethylenediamine, N,N,N',N'-tetramethyl-butanediamine, N,N,N',N'-tetramethyl-hexanediamine, pentamethyl-diethylenetriamine, Tetramethyldiaminoethylether, bis-(dimethylaminopropyl)-urea, N,N-dimethylbenzylamine, dimethylpiperazine, 1,2-dimethylimidazole, 1-methylimidazole, 1-aza-bicyclo (3,3,0) octane and preferably 1,4-diazabicyclo (2,2,2) octane and alkanolamine compounds such as triethanolamine, triisopropanolamine, N-methyl- and N-ethyldiethanolamine and dimethylethanolamine. Examples of organic metal catalyst compounds include zinc salts such as zinc octoate, organic tin compounds such as tin (II) salts of organic carboxylic acids, tin (II) acetate, tin (II) octoate, tin (II) ethylhexanoate and tin (II) laurate, and the dialkyltin (IV) salts of organic carboxylic acids, dibutyltin diacetate, dibutyltin dilaurate, dibutyltin maleate and dioctyltin diacetate, and also bismuth, such as bismuth (III) neodecanoate, bismuth 2-ethylhexanoate and bismuth octanoate or mixtures thereof. The organic metal compounds can be used alone or in combination with amine based catalysts. The catalyst may represent from 0.01 wt % to 2 wt % based on the total weight of the polyol formulation.

Examples of commercially available catalysts include DABCO® 33 LM (Air Products/Evonik), NIAX™ A-1 Catalyst (Momentive Performance Materials Inc.); FOMREZ™ UL 22 (Momentive Performance Materials Inc.); TEGOAMIN® AS MEG (EVONIK Nutrition & Care GmbH); TOYOCAT® MR (Tosoh Corporation), DABCO® BDMA (Air Products) and DABCO® XD 102 (Air Products/Evonik).

Surfactants suitable for the present disclosure include silicon based surfactants. Examples of such surfactants include DABCO® DC 193 (Air Products) and TEGOSTAB™ B 2114 (EVONIK Nutrition & Care GmbH) and DABCO® DC 3043 (Air Products). The surfactants may represent from 0.05 wt % to 3 wt % based on the total weight of the polyol formulation.

The isocyanate pre-polymer includes 55 to 70 wt. % of an isocyanate blend having at least 90 wt. % of 4,4'-diphenylmethane diisocyanate, and 30 to 45 wt. % of the PTMEG, where the isocyanate pre-polymer has an isocyanate content of 16 to 21 wt. % based on the total weight of the isocyanate pre-polymer. Preferably, the isocyanate pre-polymer has an isocyanate content of 18 to 20 wt. % based on the total weight of the isocyanate pre-polymer. Preferably, the isocyanate pre-polymer includes 60 to 65 wt. % of the isocyanate blend and 35 to 40 wt. % of the PTMEG. Preferably, the isocyanate blend can include 94 to 99 wt. % of 4,4'-diphenylmethane diisocyanate and 6 to 1 wt. % of 2,4'-diphenylmethane diisocyanate. More preferably, the isocyanate blend can include 97 to 98 wt. % of 4,4'-diphenylmethane diisocyanate and 3 to 2 wt. % of 2,4'-diphenylmethane diisocyanate. Suitable examples of the isocyanate blend described herein include those available from The Dow Chemical Company under the tradename ISONATE™ M 125 MDI.

The isocyanate pre-polymer of the mixture can further include 1 to 3 wt. % of an ethylene oxide/propylene oxide diol having a hydroxyl number of 26 to 29, and 3 to 5 wt. % of an uretonimine modified methylene diphenyl diisocyanate. In one embodiment, the isocyanate pre-polymer of the mixture includes 2 wt. % of the ethylene oxide/propylene oxide diol, and 4 wt. % of the uretonimine modified methylene diphenyl diisocyanate, where the wt. % are based on the total weight of the isocyanate pre-polymer. An example of the ethylene oxide/propylene oxide diol includes VORANOL™ EP 1900 Polyol, available from The Dow Chemical Company. An example of an uretonimine modified methylene diphenyl diisocyanate includes ISONATE™ PR 7020 Isocyanate. Preferably, the isocyanate pre-polymer includes 56 to 61 wt. % of the isocyanate blend, 33 to 38 wt. % of the PTMEG, 3 to 5 wt. % of the uretonimine modified methylene diphenyl diisocyanate and 1 to 3 wt. % of the ethylene oxide/propylene oxide diol having a hydroxyl number of 26 to 29, where the wt. % are based on the total weight of the isocyanate pre-polymer.

The isocyanate pre-polymer can further includes a second isocyanate pre-polymer based on diphenylmethane diisocyanate ("MDI") and polyether diols and polyether triols having an average NCO content from 17.9 wt. % to 18.9 wt. % based on the total weight of the second isocyanate pre-polymer. An example of the second isocyanate pre-polymer is VORALAST™ GE 143 Isocyanate, a commercial pre-polymer from The Dow Chemical Company. The second isocyanate pre-polymer could be used neat or blended with the isocyanate pre-polymer described herein (e.g., recipe seen in Table 3 of the Examples section below) at different ratios. Examples of such ratios include a range of ratios from 0:100 to 100:0 of the second isocyanate pre-polymer:isocyanate pre-polymer. Other ranges of the ratio include from 1:100 to 100:1 of the second isocyanate pre-polymer:isocyanate pre-polymer. As noted above, a preferred example of the isocyanate pre-polymer to use with the second isocyanate pre-polymer is found in Table 3 in the Examples section below. Other examples of the isocyanate pre-polymer to use with the second isocyanate pre-polymer are found in the preceding two paragraphs.

The isocyanate pre-polymer of the present disclosure has an isocyanate (—N═C═O) content from 16 wt % to 21 wt % (e.g., a content of 16 wt % to 21 wt. %) based on a total weight of the isocyanate pre-polymer. Preferably, the isocyanate pre-polymer of the present disclosure has an isocyanate content from 18 wt % to 20 wt % based on a total weight of the isocyanate pre-polymer. The mixture used to form the polyurethane elastomer foam can further include at least one auxiliary agent. Such auxiliary agents can include a cell regulator, a crosslinking agent (e.g., glycerine and diethanolamine among others), a pigment, a reinforcing material such as a glass fiber, a surface-active compound, and/or a stabilizer. Each of the auxiliary agents, when present, can be added to one of the polyol formulation or the isocyanate pre-polymer.

The present disclosure also provides for a method of forming the polyurethane elastomer foam. The method includes providing a polyol formulation that includes the glycol mixture consisting of 85 to 92 wt. % of the PTMEG, as described herein, and 4 to 10 wt. % of MEG; the at least one blowing agent, the at least one catalyst; and the at least one surfactant, where the wt. % values for the polyol formulation are based on the total weight of the polyol formulation and where the at least one blowing agent, the at least one catalyst and the at least one surfactant together bring the wt. % of the polyol formulation to 100 wt. %.

The method further includes providing a mixture at a temperature of 65° C., where the mixture has 55 to 70 wt. % of the isocyanate blend, as discussed herein, 30 to 45 wt. % of the PTMEG; and 1 to 3 wt. % of the ethylene oxide/propylene oxide diol, as discussed herein. The mixture is heated to a temperature of 85° C. and mixed at 85° C. for two (2) hours. After mixing at 85° C. for two hours, the mixture is cooled to 70° C. The method further includes admixing 3 to 5 wt. % of the uretonimine modified methylene diphenyl diisocyanate with the mixture to form the isocyanate pre-polymer having an isocyanate content of 16 to 21 wt. % based on the total weight of the isocyanate pre-polymer. Preferably, method includes admixing 3 to 5 wt. % of the uretonimine modified methylene diphenyl diisocyanate with the mixture to form the isocyanate pre-polymer having an isocyanate content of 18 to 20 wt. % based on the total weight of the isocyanate pre-polymer. The method further includes mixing 60 to 50 wt. % of the polyol formulation and 40 to 50 wt. % of the isocyanate pre-polymer to form the reaction mixture, where the wt. % is based on the total weight of the mixture. Allow the reaction mixture to react in a mold having a mold temperature of 60° C. to 85° C. to form the polyurethane elastomer foam. Preferably, the reaction mixture reacts in a mold having a mold temperature of 75 to 80° C. to form the polyurethane elastomer foam of the present disclosure.

The polyurethane elastomer foam according to the present disclosure is preferably produced by the one shot process using a low-pressure or a high-pressure technique in closed mold, advantageously heated molds. The polyurethane elastomer foam according to the present disclosure can also be produced in an open mold using a pouring or casting machine, as are known. The molds are usually metal (e.g., aluminum or steel). These procedures are described, for example, by Piechota and Rohr in "Integral", Carl Hanser Verlag, Munich, Vienna, 1975, or in "Plastics Handbook", Volume 7, Polyurethane, 3rd Edition, 1993, Chapter. 7. Optionally, the forms may already contain other parts of the shoe sole, such as the outer sole or parts of the midsole.

EXAMPLES

All components purchased from commercial vendors and used as received unless otherwise noted. All percentages are weight percentages (wt. %) based on the total weight of the mixture used to form the polyurethane elastomer foam, unless otherwise noted.

The components used for preparing the polyurethane elastomer foam of the following Examples are listed in Table 1.

TABLE 1

| Components and Commercial Sources | |
|---|---|
| Components | Source |
| MonoEthylene Glycol (MEG) | The Dow Chemical Company |
| DABCO ® DC 193 | Air Products |
| DABCO ® 33 LM | Air Products |
| NIAX ™ A-1 Catalyst | Momentive Performance Materials Inc. |
| Glycerine | Green Oleo |
| FOMREZ ™ UL 22 | Momentive Performance Materials Inc. |
| TERATHANE ® PTMEG 2000 | INVISTA |
| TEGOAMIN ® AS MEG | Evonik |
| TOYOCAT ® MR Catalyst | Tosoh Corporation |
| DABCO ® DC 3043 | Air Products |
| TEGOSTAB ™ B 2114 Silicone Surfactant | Evonik |
| ISONATE ™ M 125 MDI | The Dow Chemical Company |
| ISONATE ™ PR 7020 Isocyanate | The Dow Chemical Company |
| VORANOL ™ EP 1900 Polyol | The Dow Chemical Company |
| DABCO ® BDMA, N,N-dimethylbenzylamine | Air Products |
| DABCO XD 102 Catalyst | Air Products/Evonik |
| Std Polyurethane System | Voralast* GB 422 Polyol in combination with Voralast* GE 143 Isocyanate, both from The Dow Chemical Company |
| EVATECH 120S crosslinkable and expandable ethylene vinyl acetate (EVA) | Fainplast compounds |
| EVATECH 140S EVA | Fainplast compounds |

Physical mechanical properties (data refers to test plate specimens) were obtained according to the following standards or protocols:

Density: DIN 53420
Hardness: DIN 53505 (on 10 mm thickness test plate)
Tear: ISO 34-Type A (Trouser)
Tensile: DIN 53504
Elongation: DIN 53504
Ball rebound: ASTM D 3574 (on 10 mm thickness test plate)
Abrasion resistance: ISO 4649
Flex fatigue: DIN 53543 at room Temperature (23° C.), with Texon and cut, using a DeMattia equipment
Compression set: ASTM D395 (at 29% 70° C./22 hours)
Measure Tg via dynamic mechanical thermal analysis using a TA Instrument DMA Q800 equipped with liquid nitrogen cooling system in tensile deformation. Prepare a specimen by removing a 1.4-1.7 mm thick layer from the surface of the original material and cut sample into a rectangular geometry of 25×7 mm. Experimental conditions are as follows: isothermal temperature at −70° C. for 2 minutes; temperature ramp from −70° C. to 100° C. at 2° C./min; frequency 1 Hertz (Hz), preload 0.01 Newton (N); strain 15 microns (μall), force track 125%; gauge distance about 20 mm; cooling agent: liquid nitrogen.

Example 1

Prepare the polyol formulation of Example 1 by admixing at room temperature (23° C.) the components at their given weight percent (wt. %) as seen in Table 2, where the wt. % is based on the total weight of the polyol formulation. PTMEG 2000 needs to be melted at 70° C. over night and then kept at 40-50° C. for a better handling and dosing together with other components.

TABLE 2

| Polyol Formulation of Example 1 | |
| --- | --- |
| | Wt. % |
| PTMEG 2000 | 89.48 |
| MEG | 7.0 |
| DABCO ® DC 193 | 0.2 |
| DABCO ® DC 3043 | 0.85 |
| TEGOSTAB ™ B 2114 | 0.8 |
| NIAX ™ A-1 Catalyst | 0.1 |
| TEGOAMIN ® AS MEG | 0.6 |
| FOMREZ ™ UL 22 | 0.02 |
| Glycerine | 0.25 |
| Water | 0.7 |

Prepare the isocyanate pre-polymer using the components at their respective wt. % seen in Table 3 (below) as follows.

TABLE 3

| Isocyanate Pre-Polymer | |
| --- | --- |
| | wt. % |
| ISONATE ™ M 125 MDI | 61.0 |
| ISONATE ™ PR 7020 Isocyanate | 4.0 |
| PTMEG 2000 | 33.0 |
| VORANOL ™ EP 1900 Polyol | 2.0 |

Prepare the isocyanate pre-polymer as follows. Add ISONATE™ M 125 at a temperature of 50° C. to a stirred reactor tank. Heat the ISONATE™ M 125 in the stirred reactor tank to a temperature of 65° C. while stirring. Add the polyol premix based on PTMEG 2000 and the EP 1900 to the stirred reactor tank and increase the temperature to 85° C. while stirring. The total amount of premix polyol is added in three (3) portions within one (1) hour time. Allow the mixture to digest at 85° C. while stirring for two (2) hours. After the two hours, cool the contents of the stirred reactor tank to 70° C. Add the ISONATE™ PR 7020 Isocyanate to the stirred reactor tank. Measure the isocyanate content to ensure an isocyanate content of 20 wt. % based on the total weight of the isocyanate pre-polymer. Unload the isocyanate pre-polymer in a proper container.

To form the polyurethane elastomer foam of Example 1, heat the formulated polyol formulation of Example 1 to a temperature of 40 to 45° C. inside the stirred reactor tank and heat the isocyanate pre-polymer to a temperature of 30 to 35° C. in an isocyanate tank of a low pressure Nuova Ama machine. Heat an aluminum mold (test plate mold 200× 200×10 mm) of a low pressure Nuova Ama machine to a temperature of 75° C. Admix 82 parts by weight of the isocyanate pre-polymer with 100 parts by weight of the polyol formulation at atmospheric pressure and pour the admixture using the low pressure Nuova Ama machine into the heated aluminum mold. Close the mold, allow the reactants to fill the mold and react for 5 minutes. Open the mold and demold the polyurethane elastomer foam. Allow the polyurethane elastomer foam to cure for 24 hours at 25° C. and 50% relative humidity before testing the physical properties of the polyurethane elastomer foam. The polyurethane elastomer foam has a density in a range of 350-400 g/l and final hardness between 45 to 52 Shore A.

Example 2

Prepare the polyol formulation of Example 2 by admixing at room temperature (23° C.) the components at their given weight percent (wt. %) as seen in Table 4, where the wt. % is based on the total weight of the polyol formulation. PTMEG 2000 needs to be melted at 70° C. over night and then kept at 40-50° C. for a better handling and dosing together with other components.

TABLE 4

| Polyol Formulation of Example 2 | |
| --- | --- |
| | Wt. % |
| PTMEG 2000 | 90.78 |
| MEG | 6.0 |
| DABCO ® DC 193 | 0.2 |
| DABCO ® DC 3043 | 0.85 |
| DABCO ® 33 LM | 0.1 |
| TOYOCAT ® MR | 0.7 |
| FOMREZ ™ UL 22 | 0.02 |
| DABCO ® BDMA | 0.2 |
| Glycerine | 0.45 |
| Water | 0.7 |

Use the isocyanate pre-polymer as prepared in Example 1.
To form the polyurethane elastomer foam of Example 2, heat the polyol formulation of Example 2 to a temperature of 40 to 45° C. inside the stirred polyol tank and heat the isocyanate pre-polymer to a temperature of 30 to 35° C. Heat the mold (test plate mold 200×200×10 mm) of a low pressure DESMA direct injection machine to a temperature of 60 to 62° C. Admix 78 parts by weight of the isocyanate pre-polymer with 100 parts by weight of the polyol formulation at atmospheric pressure and inject the admixture into the heated test plate mold. Allow the reactants to fill the mold and react for 5 minutes. Demold the polyurethane elastomer foam and allow the polyurethane elastomer foam to cure for 24 hours at 25° C. and 50% relative humidity before testing the physical properties of the polyurethane elastomer foam. The polyurethane elastomer foam has a density in a range of 330-350 g/l and final hardness between 40 to 42 Shore A.

Example 3

Prepare the polyol formulation of Example 3 by admixing at room temperature (23° C.) the components at their given weight percent (wt. %) as seen in Table 5, where the wt. % is based on the total weight of the polyol formulation. PTMEG 2000 needs to be melted at 70° C. over night and then kept at 40-50° C. for a better handling and dosing together with other components.

TABLE 5

Polyol Formulation of Example 3

| | Wt. % |
|---|---|
| PTMEG 2000 | 88.58 |
| MEG | 7.7 |
| DABCO ® DC 193 | 0.2 |
| DABCO ® DC 3043 | 0.85 |
| TEGOSTAB ™ B 2114 | 0.8 |
| NIAX ™ A-1 Catalyst | 0.1 |
| TEGOAMIN ® AS MEG | 0.3 |
| FOMREZ ™ UL 22 | 0.02 |
| DABCO XD 102 Catalyst | 0.7 |
| Water | 0.75 |

Prepare the isocyanate pre-polymer using the components at their respective wt. % seen in Table 6 (below) as follows.

TABLE 6

Isocyanate Pre-Polymer

| | wt. % |
|---|---|
| ISONATE ™ M 125 MDI | 56.0 |
| ISONATE ™ PR 7020 Isocyanate | 4.0 |
| PTMEG 2000 | 38.0 |
| VORANOL ™ EP 1900 Polyol | 2.0 |

Prepare the isocyanate pre-polymer as follows. Add ISONATE™ M 125 at a temperature of 50° C. to a stirred reactor tank. Heat the ISONATE™ M 125 in the stirred reactor tank to a temperature of 65° C. while stirring. Add the polyol premix based on PTMEG 2000 and the EP 1900 to the stirred reactor tank and increase the temperature to 85° C. while stirring. The total amount of premix polyol is added in three (3) portions within one (1) hour time. Allow the mixture to digest at 85° C. while stirring for two (2) hours. After the two hours, cool the contents of the stirred reactor tank to 70° C. Add the ISONATE™ PR 7020 Isocyanate to the stirred reactor tank. Measure the isocyanate content to ensure an isocyanate content of 18.1 wt. % based on the total weight of the isocyanate pre-polymer. Unload the isocyanate pre-polymer in a proper container.

To form the polyurethane elastomer foam of Example 3, heat the formulated polyol formulation of Example 3 to a temperature of 40 to 45° C. inside the stirred polyol tank and heat the isocyanate pre-polymer to a temperature of 30 to 35° C. in an isocyanate tank of a low pressure Nuova Ama machine. Heat an aluminum mold (test plate mold 200× 200×10 mm) of a low pressure Nuova Ama machine to a temperature of at least 75° C. Admix 96 parts by weight of the isocyanate pre-polymer with 100 parts by weight of the polyol formulation at atmospheric pressure and pour the admixture using the low pressure Nuova Ama machine into the heated aluminum mold. Close the mold, allow the reactants to fill the mold and react for 4 minutes. Open the mold and demold the polyurethane elastomer foam. Allow the polyurethane elastomer foam to cure for 24 hours at 25° C. and 50% relative humidity before testing the physical properties of the polyurethane elastomer foam. The polyurethane elastomer foam has a density in a range of 350-400 g/l and final hardness between 45 to 52 Shore A.

Physical Properties and Comparative Results

Table 7, below, provides a summary of performances belonging to the polyurethane elastomer foam of Example 1 as compared to three commercially available materials, a polyether based polyurethane elastomer foam and two expanded ethylene vinyl acetate (EVA) based foams, all of them are typically used in the production of soles, midsoles and/or insoles of shoes.

TABLE 7

Comparison of Physical Properties of Polyurethane elastomer foam of Example 1 and 3 Against Commercially Available Polyurethane elastomer foam and EVA materials available in the market (benchmark)

| | Example 1 | Example 2 | STD polyether PU system | EVATECH 120S | EVATECH 140S |
|---|---|---|---|---|---|
| Molded density (g/l) | 350-400 | 380 | 500-520 | 500-550 | 350-380 |
| Hardness (ShA) | 45-52 | 45 | 53-56 | 55-62 | 48-53 |
| Tear strength (N/mm) | 4.5-5.1 | 3.6 | 6.0 | 5.2-5.9 | 4.0-4.5 |
| Tensile strength (N/mm$^2$) | 4.8 | 4.8 | 4.5 | 6.0 | 3.8-4.0 |
| Elongation (%) | 390 | 370 | 400 | 400 | 340 |
| Ball rebound (%) | >55 | 58 | 25-30 | 25-30 | 25 |
| Abrasion resistance (mg lost) | 50-60 | 73 | <100 | 80 | 100 |

TABLE 7-continued

Comparison of Physical Properties of Polyurethane elastomer foam of Example 1 and 3 Against Commercially Available Polyurethane elastomer foam and EVA materials available in the market (benchmark)

| | Example 1 | Example 2 | STD polyether PU system | EVATECH 120S | EVATECH 140S |
|---|---|---|---|---|---|
| Flex fatigue @ 23° C. with Texon and cut, after 30 kcycles | no cut growth | no cut growth | no cut growth | no cut growth | no cut growth |
| Compression set (%)* | | 75 | na | na | 95-100 |
| DMT (min) | | 4-4.5 | 4 | 3.5-4 | 8-12 |

*as a percentage of the original deformation in compression @ 30% for 22 h at 70° C.: lower the value, better the performance As understood by one skilled in the art, expanded EVA is more expensive to produce than polyurethane. In addition, the dimensional stability of expanded EVA is poor and highly sensitive to environment conditions (e.g., temperature and humidity). This can mean high scraps rate during production of expanded EVA. The difference helps to highlight the benefits of using the polyurethane elastomer foams of the present disclosure rather than EVA foams.

Performances of the polyurethane elastomer foam of Examples 1, 2 and 3 are seen in Table 8, below. Table 8 also provides the performances of the polyurethane elastomer foam of Comparative Examples A and B. Prepare Comparative Examples A and B using the isocyanate pre-polymer used in Examples 1 and 2, while the polyol formulations for each of Comparative Examples A and B are as seen in Table 8. Prepare Comparative Examples A and B by heating the formulated polyol formulation as seen in Table 8 to a temperature of 40 to 45° C. and heat the isocyanate pre-polymer to a temperature of 30 to 35° C. in the polyol and isocyanate tanks of the low pressure Nuova Ama machine. Heat the aluminum mold (test plate mold 200×200×10 mm) of the low pressure Nuova Ama machine to a temperature of 60° C. Admix the isocyanate pre-polymer with the formulated polyol formulation of Comparative Examples A and B at atmospheric pressure and pour the admixture using the low pressure Nuova Ama machine into the heated aluminum mold. Close the mold, allow the reactants to fill the mold and react for 5 minutes. Open the mold and demold the polyurethane elastomer foam of Comparative Examples A and B.

The properties of Examples 1, 2 and 3 and Comparative Examples A and B seen in Table 8 demonstrate that the use of butane-1,4-diol instead of MEG has a negative impact on the final performances of the polyurethane elastomer foam.

TABLE 8

Comparison of Physical Properties of Polyurethane elastomer foam of Examples 1 and 3 Against Comparative Examples of Polyurethane elastomer foam containing butanediol

| | Example 1 MEG 1 (pbw) | Example 2 MEG 2 (pbw) | Example 3 MEG 3 (pbw) | Comparative Example A BD 1 (pbw) | Comparative Example B BD 2 (pbw) |
|---|---|---|---|---|---|
| PTMEG 2000 | 89.48 | 90.78 | 88.58 | 87.64 | 85.92 |
| MEG | 7.0 | 6.0 | 7.7 | — | — |
| Butane-1,4-diol | — | — | — | 9.5 | 11.0 |
| NIAX ™ A1 | 0.1 | — | 0.1 | 0.1 | 0.1 |
| DABCO ® 33 LB | — | — | — | 0.8 | 0.7 |
| DABCO ® 33 LM | — | 0.1 | — | — | — |
| Glycerine | 0.25 | 0.45 | — | — | — |
| Water | 0.70 | 0.70 | 0.75 | 0.65 | 0.57 |
| TEGOAMIN ® AS MEG | 0.60 | — | 0.3 | — | — |
| FOMREZ ™ UL 22 | 0.02 | 0.02 | 0.02 | 0.01 | 0.01 |
| TOYOCAT ® MR | — | 0.70 | — | 0.4 | 0.4 |
| DABCO ® BDMA | — | 0.20 | — | — | — |
| DC 193 | 0.20 | 0.20 | 0.2 | 0.1 | — |
| TEGOSTAB ™ B 2114 | 0.80 | — | 0.8 | 0.8 | 0.8 |
| DABCO ® DC 3043 | 0.85 | 0.85 | 0.85 | — | 0.5 |
| DABCO ® XD 102 | — | — | 0.7 | — | — |
| Total Polyol formulation (parts) | 100.0 | 100.0 | 100.0 | 100.0 | 100.0 |
| Isocyanate Pre-Polymer (parts) | 82.0 | 78.0 | 96.0 | 78.0 | 84.0 |
| PROPERTIES | | | | | |
| Free rise density (g/l) | 200 | 170 | 210 | 165 | 195 |
| Density (g/l) | 350-400 | 330-340 | 360 | 340 | 340 |
| Ball rebound (%) | 55-60 | 60-62 | 58 | 45 | 47 |
| Tear Strength (N/mm) | 4.5-5.1 | 2.80-3.10 | 3.6 | 3.43 | 3.05 |
| Tensile Strength (N/mm2) | 4.8 | 6.0-6.6 | 4.8 | 3.64 | 4.1 |

TABLE 8-continued

Comparison of Physical Properties of Polyurethane elastomer foam of Examples 1 and 3 Against Comparative Examples of Polyurethane elastomer foam containing butanediol

|  | Example 1 MEG 1 (pbw) | Example 2 MEG 2 (pbw) | Example 3 MEG 3 (pbw) | Comparative Example A BD 1 (pbw) | Comparative Example B BD 2 (pbw) |
|---|---|---|---|---|---|
| Elongation at Break (%) | 390 | 350-390 | 370 | 346 | 350 |
| Hardness (ShA) | 45-52 | 40-43 | 45 | 35 | 42-45 |
| Abrasion (mg lost) | 50-60 | — | 73 | 39 | 39 |
| Other info |  |  |  | Shrinkage | Shrinkage |
| Flex Fatigue | >=30,000 cycles | — | >=30,000 cycles | — | — |
| Tear Strength (N/mm2) After Humid Aging (1 week at 70° C. and 100% RH) | — | 3.3 |  | — | — |
| Tensile Strength (N/mm2) After Humid Aging (1 week at 70° C. and 100% RH) | — | 6.4 |  | — | — |
| Elongation at Break After Humid Aging (1 week at 70° C. and 100% RH) | — | 370% |  | — | — |

What is claimed is:

1. A polyurethane elastomer foam having a density of 100 to 500 g/L measured according to DIN 53420 and a Shore A hardness of 40 to 55 measured according to DIN 53505, where the polyurethane elastomer foam is formed by reacting a mixture comprising:
60 to 50 weight percent (wt. %) of a polyol formulation and 40 to 50 wt. % isocyanate pre-polymer, wherein the wt. % is based on the total weight of the mixture;
wherein the polyol formulation includes:
a glycol mixture consisting of:
85 to 92 wt. % of a polytetramethylene ether glycol (PTMEG) with a weight average molecular weight (MWw) of 1900 to 2100 and a hydroxyl number of about 53 to about 60; and
4 to 10 wt. % of monoethylene glycol;
at least one blowing agent;
at least one catalyst; and
at least one surfactant, where the wt. % values for the polyol formulation are based on the total weight of the polyol formulation and wherein the at least one blowing agent, the at least one catalyst and the at least one surfactant together bring the wt. % of the polyol formulation to 100 wt. %;
and
wherein the isocyanate pre-polymer includes:
55 to 70 wt. % of a isocyanate blend having at least 90 wt. % of 4,4'-diphenylmethane diisocyanate; and
30 to 45 wt. % of the PTMEG, wherein the isocyanate pre-polymer has an isocyanate content of 16 to 21 wt. % based on the total weight of the isocyanate pre-polymer, and the polyurethane elastomer foam has a ball rebound of at least 50% measured according to ASTM D3574 on a 10 mm thickness test plate.

2. The polyurethane elastomer foam of claim 1, wherein the polyol formulation includes 6 to 8 wt. % of monoethylene glycol.

3. The polyurethane elastomer foam of claim 1, wherein the polyol formulation includes 88 to 91 wt. % of the PTMEG.

4. The polyurethane elastomer foam of claim 3, wherein the polyol formulation includes 7 wt. % of the monoethylene glycol and 0.7 wt. % of the at least one blowing agent.

5. The polyurethane elastomer foam of claim 3, wherein the polyol formulation includes 7.7 wt. % of the monoethylene glycol and 0.75 wt. % of the at least one blowing agent.

6. The polyurethane elastomer foam of claim 1, wherein the isocyanate blend has 94 to 99 wt. % of 4,4'-diphenylmethane diisocyanate and 6 to 1 wt. % of 2,4'-diphenylmethane diisocyanate.

7. The polyurethane elastomer foam of claim 1, wherein the isocyanate blend has 97 to 98 wt. % of 4,4'-diphenylmethane diisocyanate and 3 to 2 wt. % of 2,4'-diphenylmethane diisocyanate.

8. The polyurethane elastomer foam of claim 1, wherein the isocyanate pre-polymer of the mixture further includes 1 to 3 wt. % of an ethylene oxide/propylene oxide diol having a hydroxyl number of 26 to 29; and 3 to 5 wt. % of an uretonimine modified methylene diphenyl diisocyanate.

9. The polyurethane elastomer foam of claim 8, wherein the isocyanate pre-polymer of the mixture includes 2 wt. % of the ethylene oxide/propylene oxide diol; and 4 wt. % of the uretonimine modified methylene diphenyl diisocyanate.

10. The polyurethane elastomer foam of claim 1, wherein the polyurethane elastomer foam has a ball rebound of 55% to 65% measured according to ASTM D3574 on a 10 mm thickness test plate.

11. The polyurethane elastomer foam of claim 1, wherein the blowing agent is water.

12. The polyurethane elastomer foam of claim 1, wherein the polyurethane elastomer foam has a flex fatigue of at least 30,000 cycles measured according to DIN 53543 at 23° C., with Texon and cut, using a DeMattia equipment.

13. The polyurethane elastomer foam of claim 1, wherein the isocyanate pre-polymer further includes a second isocyanate pre-polymer based on diphenylmethane diisocyanate and polyether diols and polyether triols having an average NCO content from 17.9 wt. % to 18.9 wt. % based on the total weight of the second isocyanate pre-polymer.

14. The polyurethane elastomer foam of claim 1, wherein the isocyanate pre-polymer has an isocyanate content of 18 to 20 wt. % based on the total weight of the isocyanate pre-polymer.

15. A shoe sole, a mid-sole or an insole formed from the polyurethane elastomer foam of claim 1.

16. A method of forming a polyurethane elastomer foam, comprising:
    providing a polyol formulation that includes:
        a glycol mixture consisting of:
            85 to 92 wt. % of a polytetramethylene ether glycol (PTMEG) with a weight average molecular weight (MWw) of 1900 to 2100 and a hydroxyl number of about 53 to about 60; and
            4 to 10 wt. % of monoethylene glycol;
        at least one blowing agent;
        at least one catalyst; and
        at least one surfactant, where the wt. % values for the polyol formulation are based on the total weight of the polyol formulation and wherein the at least one blowing agent, the at least one catalyst and the at least one surfactant together bring the wt. % of the polyol formulation part to 100 wt. %;
    providing a mixture at a temperature of 65° C., where the mixture has:
        55 to 70 wt. % of a isocyanate blend having at least 90 wt. % of 4,4'-diphenylmethane diisocyanate; and
        30 to 45 wt. % of the PTMEG; and
        1 to 3 wt. % of an ethylene oxide/propylene oxide diol having a hydroxyl number of 26 to 29;
    heating the mixture to a temperature of 85° C.;
    mixing the mixture at 85° C. for two (2) hours;
    cooling the mixture to 70° C. after mixing for two hours;
    admixing 3 to 5 wt. % of an uretonimine modified methylene diphenyl diisocyanate with the mixture to form an isocyanate pre-polymer having an isocyanate content of 16 to 21 wt. % based on the total weight of the isocyanate pre-polymer;
    mixing 60 to 50 wt. % of the polyol formulation and 40 to 50 wt. % of the isocyanate pre-polymer to form a reaction mixture, wherein the wt. % is based on the total weight of the mixture; and
    allowing the reaction mixture to react to form the polyurethane elastomer foam.

17. The method of claim 16, wherein admixing 3 to 5 wt. % of an uretonimine modified methylene diphenyl diisocyanate with the mixture to form an isocyanate pre-polymer having an isocyanate content of 18 to 20 wt. % based on the total weight of the isocyanate pre-polymer.

18. The method of claim 16, wherein allowing the reaction mixture to react to form the polyurethane elastomer foam is done at a mold temperature of 60 to 85° C.

* * * * *